Sept. 17, 1957
H. P. LUHN
2,806,986
HIGH PERFORMANCE SERVO SYSTEM
Filed Dec. 31, 1954
2 Sheets-Sheet 1
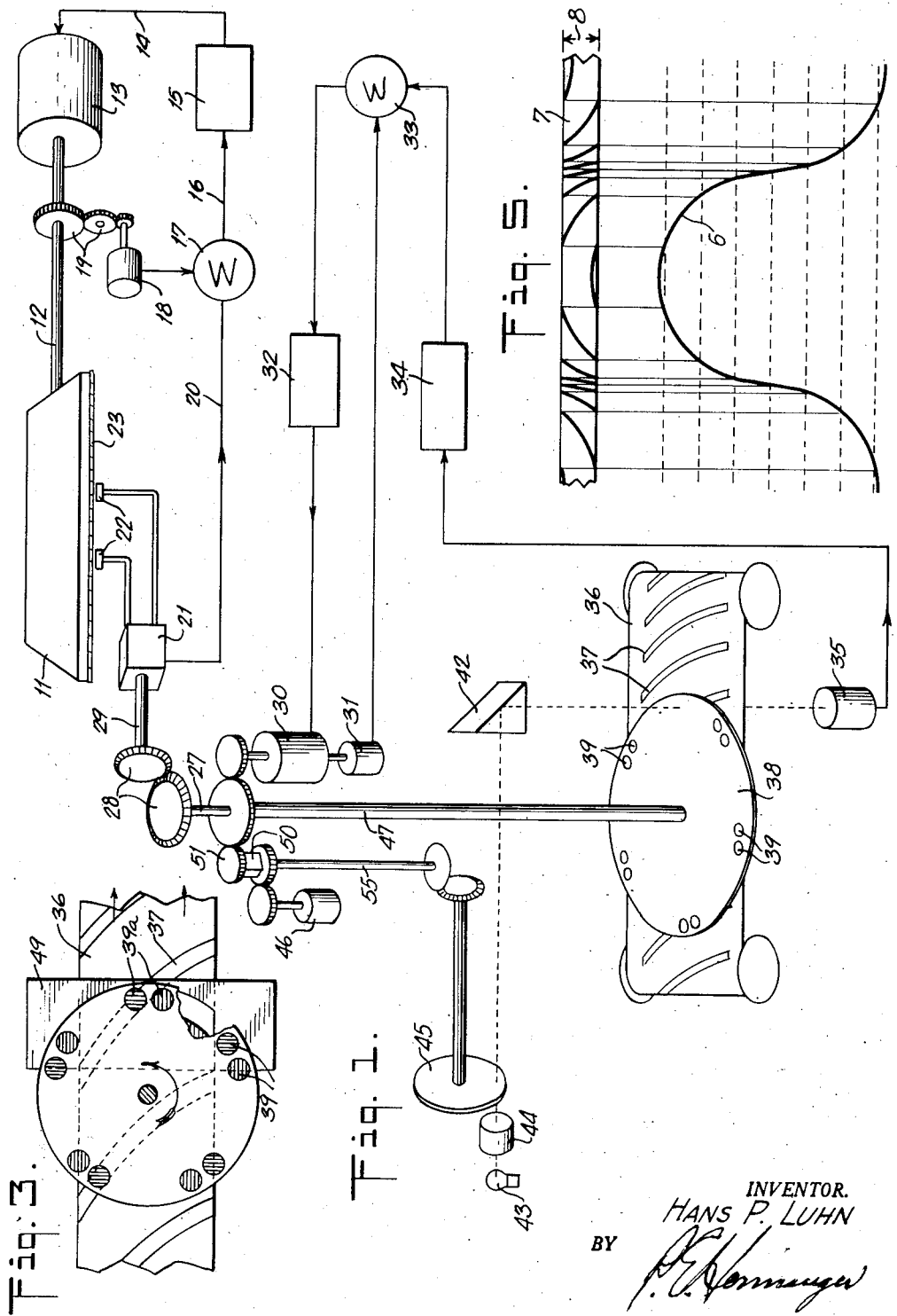
INVENTOR.
HANS P. LUHN
BY
ATTORNEY

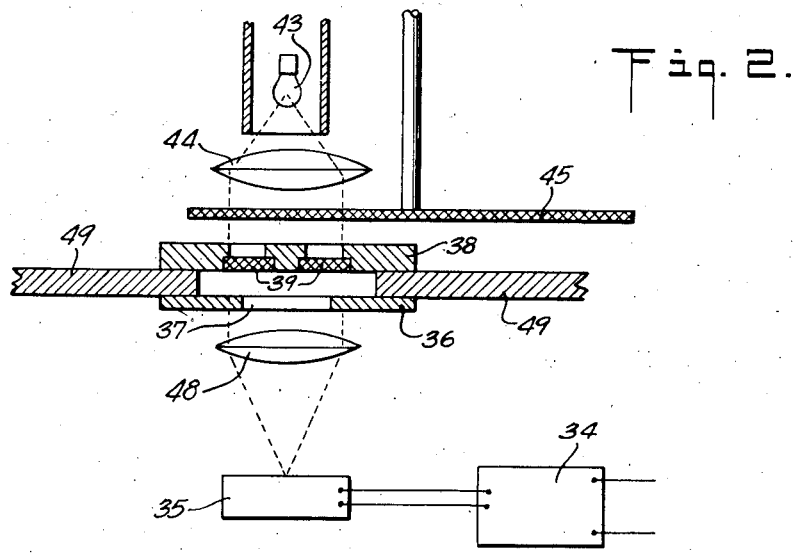
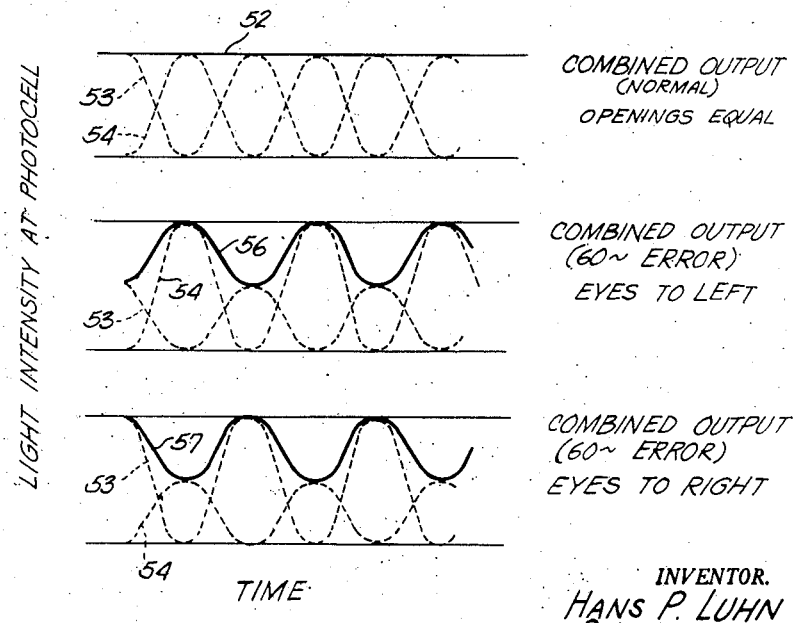

United States Patent Office 2,806,986
Patented Sept. 17, 1957

2,806,986

HIGH PERFORMANCE SERVO SYSTEM

Hans P. Luhn, Armonk, N. Y., assignor to International Business Machines Corporation, New York, N. Y., a corporation of New York Application December 31, 1954, Serial No. 479,080

4 Claims. (Cl. 318—162)

This invention is concerned with an improvement for servo systems generally, and more specifically with an improved high performance servo that is controlled by a segmentized pattern or master.

In a system according to this invention there is provided a servo including a master control pattern that has a novel characteristic of being segmentized in such a way that the curve for a given axis of control movement relative to time is in effect compressed in one direction, so that a greatly enlarged pattern or trace may be employed while using a thin strip of appropriate material for containing the trace thereon. Thus, the enlargement is compactly contained in one direction by rolling up the strip having the trace thereon, while the enlargement in the direction at right angles thereto is all contained on the relatively narrow width, by breaking the trace into segments that represent so much of the trace as may be contained across the effective width of the strip.

This invention is particularly adaptable to machine tool control servos wherein a very greatly magnified pattern or record of the control movements for each of the axes of the workpiece about which the machine tool is moved in producing the finished workpiece may be employed. In this way very high performance may be accomplished, due to the fine degree of control which may be exercised on account of the reduction from the master or controlling record. In addition, a single record strip may contain a plurality of channels of information thereon; one channel for each control axis of space-time control as exercised by the particular machine tool in question.

Consequently, it is an object of this invention to provide an improved servo system which employs a segmentized control curve as contained on a given medium in the form of telescoped information; then, to control the servo motor in a continuous manner, so that the output of the servo motor may be accurately determined on account of the reduction in size of the output motion relative to input curve representation.

It is another object of this invention to provide a means for obtaining a control signal involving the use of variations in the intensities of the light received over two paths, while using only a single photo cell. In this manner, the difficulties involved in exactly matching two photo cells and their separate circuits are entirely avoided.

Briefly, this invention concerns a certain combination to be included in a high performance servo system having a reversible motor and also having error signal means for energizing said motor. The combination comprises a segmentized medium for determining the energization of the motor and means driven by the motor for controlling the speed thereof in accordance with the segments on the medium in a continuous manner.

An illustrative embodiment of this invention is set forth below and illustrated in the drawings, in which:

Fig. 1 is a schematic showing of a servo system according to this invention as applied to a machine tool control;

Fig. 2 is a cross-sectional view illustrating in some detail the elements involved in generation of a control or error signal in the system;

Fig. 3 is an enlarged detail plan view showing the relationship between the tape and the disc carrying "eyes" for following the tape;

Fig. 4 is a diagram illustrating the wave forms of various signals as generated by the scanning or following of the tape; and Fig. 5 is an illustration of the manner in which the segments of the trace on the control tape are taken from a given space-time curve representing a control function for the servo motor controlled thereby.

In order to appreciate the nature of the segmentized trace which this system employs, reference may be had to Fig. 5. There is shown a space time curve 6 that is telescoped in one dimension, as indicated in the drawing, onto a strip 7 that has a given effective width 8. Thus, while the full length of the curve in a horizontal direction, as viewed in Fig. 5, is still maintained, the vertical dimension of the curve (as viewed in Fig. 5) is compressed, or telescoped, into the effective width of the strip 7. Consequently, a very large curve extending in two directions may be compactly contained on a narrow strip that can be rolled up so as to occupy a minimum of space.

A servo system according to this invention is illustrated in Fig. 1 and shows a particular application for such a system in connection with a machine tool automatic control. Although any desired type of load may be driven by the output of the servo system which employs this invention, it is particularly well adapted for use with a machine tool control. In a machine tool control there may be a displacement driving arrangement for one or more axes of the machine. However, since the control for all of the axes are identical in the various elements involved, only the control for one axis is illustrated.

There is shown schematically a worktable 11 that is positioned horizontally (as viewed in Fig. 1) by a threaded drive screw (not shown) that is turned by a shaft 12 which is driven by a motor 13. The motor 13 may be any feasible servomotor having sufficient power to adequately position the worktable 11 and the energization of the motor 13 is conventional in nature. This energization is indicated by a circuit illustrated as employing an input line 14 which leads from an amplifier 15 which in turn is fed over a line 16 that leads from a signal summation network 17. There is also included a tachometer 18 that is connected by gearing 19 to the shaft 12 of the motor 13. An output signal from the tachometer 18 is fed to the summation network 17 as indicated. Another input to the summation network 17 is a control signal often termed an "error signal" that is fed over a line 20 from a pickoff positioning device 21 that carries a pair of pickoff elements 22. The pickoff elements 22 may take various forms but will act in cooperation with a longitudinally positioned bar 23 that may be a notched magnetic material bar having particular characteristics such that the pickoff elements 22 acting in cooperation therewith will produce an error signal upon a lack of correspondence between the pickoff elements and a given location along the notched bar 23. It is pointed out that the machine tool driving servo system, as described so far, is conventional in nature and all of the elements are well known. One exception to this situation is in connection with the positioning device 21 for the pickoff elements 22. These elements as here illustrated represent a precision positioning device such as that described and claimed in detail in my copending application Serial No. 430,655, filed May 18, 1954, now Patent No. 2,782,348. Such details are not material to this invention since the positioning device 21 might be any sufficiently accurate positioning means for determining the location and movements of a pickoff element such as one of the pickoffs 22, so that an error signal is developed for controlling the servomotor 13 to position the worktable 11 (in accordance with the position dictated by the pickoff element 22).

However, the applicability of the particular pickoff positioning device as shown and described by the above copending application will be appreciated when it is pointed out that a prime source of error in operating a machine tool control of this sort lies in the drive screw for positioning the table about any one of its axes. This is because such a drive screw must be relatively long to gain the desired span of movement, and the manufacture of a long screw having sufficient accuracy is prohibitive if not impossible. Consequently, the particular positioning device 21 makes use of an arrangement whereby a pair of pickoff elements 22 are moved alternately over a given short distance, and movement of each is in turn directly controlled by a relatively short and highly accurate screw. Therefore, the position of the pickoff elements may be controlled to a very high degree of accuracy. Then, by transferring the pickoff signal from one to the other of the pickoff elements 22 at the end points of the given short distance of control movement, the error signal for the system controlling the position of worktable 11, may be continued in a step by step manner over the entire distance of travel for the table 11 while maintaining the accuracy of the positioning screw in the device 21. To accomplish this, the pickoff elements have a predetermined separation at the time when the signal is transferred. This separation equals one unit of the notched bar 23 so that the signal generated in each of the pickoffs is identical at that time.

In order to obtain a desired high quality of performance of the input to positioning device 21, a servo system according to this invention may be employed. Such a servo system includes an output shaft 27 that is connected by gears 28 to shaft 29 of the positioning device 21. Output shaft 27 is also connected by appropriate gear reduction as illustrated to a servomotor 30, which has a tachometer 31 driven thereby, and is electrically connected to an amplifier 32. The electrical control system for servomotor 30 is conventional and includes a summation network 33 which feeds the amplifier 32 and which is fed by a signal from the tachometer 31 and an error signal as transmitted from a preamplifier 34.

Preamplifier 34 is fed by a signal as generated in a phototube or cell 35 which receives light having varying intensity that is transmitted through an opaque tape 36, having clear or transparent slots or segments 37 located across the width of, or along the length of, the tape 36. These segments have variable slopes and may be generated from a combination of a predetermined number of fixed slopes from a maximum to zero. Situated directly above the tape 36 in the path of the light beam that is directed toward photo cell 35 there is an opaque follower disc 38 which has a plurality of pairs of "eyes" 39 located near the periphery thereof. These "eyes" 39 will be situated over a given one of the slots 37 straddling the same, and as the tape 36 is driven or moved horizontally underneath the disc 38, the given pair of eyes 39 will be caused to follow the slot 37 in a manner to be more fully described below. The light source or beam for the photo cell 35 may be created in any convenient and feasible manner, such as that schematically illustrated having a prism 42 for turning the path of the light at right angles and having a source of light 43 that is changed into a parallel light beam by a lens system 44. The light beam is polarized and the plane of polarization is given a relative speed of rotation by a disc 45. The disc 45 is homogeneous, at least in so far as that portion where the light beam passes, in that the material employed polarizes the light into a given single plane. Consequently, the plane of polarization of the light beam passing therethrough is rotated through three hundred and sixty degrees with each revolution of the disc. The disc 45 is driven by a constant speed motor 46 via a mechanical differential 50, at a resultant velocity such that a desired frequency in the rotation of the plane of polarization through a half revolution is had, e. g. 1800 R. P. M. of the disc 45, plus or minus the speed of revolution of the disc 38, which produces 60 cycles per second where the cycle is completed by one hundred and eighty degrees of rotation of the light polarizing disc 45, plus or minus the amount of rotation of the follower disc 38 during this time.

It will be noted that the disc 38 carrying eyes 39 is driven in rotation by a shaft 47 that is directly connected by reduction gearing to the servo motor 30. However, an input gear 51 of the differential 50 is also driven directly by the servo motor 30. Consequently the light polarizing disc 45 is rotated at a speed that is equal to the speed of rotation of the motor 46 plus or minus the speed of rotation of the sensing or follower disc 38. This is because the differential 50 has one input driven by the constant speed motor 46, as illustrated, the other input driven via the gear 51 from the servo motor 30, as illustrated and the output driving a shaft 55 that connects directly to the light polarizing disc 45. In this manner the error signal that is produced by the interaction between tape 36 with its segments 37, and the eyes 39 of the follower disc 38, has a constant frequency and causes the motor 30 to run at a speed and in a direction such that for each clear slot or segment 37, a given pair of eyes 39 will remain straddling the slot for the full length thereof. Each successive pair of eyes 39 will pick up the following segment 37, as the preceding pair of eyes leaves its segment 37. The uniform rate of advance of the tape 36 past the follower disc 38 tends to produce a continuous, unsymmetrical disposition of each pair of eyes 39 with respect to that segment 37 with which they are cooperating. An error signal is thus generated which is summed with the feedback signal from the tachometer 31 to produce an input control signal to the amplifier 32.

In order to understand the nature of the control or error signals as produced by the photo cell 35 and fed to the servo motor 30, reference is made to the details of the segmentized medium, which in this instance takes the form of a tape 36, and its related elements including the follower disc 38 with eyes 39 contained therein.

Referring to Fig. 2, it will be observed that a cross-sectional schematic illustrates the relationship between the tape 36 and the disc 38, as well as the light polarizing disc 45 and the pair of eyes 39. It will be observed that the light source 43 is transformed into parallel light by a lens system 44 and passes through the light polarizing disc 45 where its plane of polarization is rotated at a given angular velocity. The light as thus polarized and rotated passes through the eyes 39 located in the follower disc 38.

Both of the eyes 39 are made of light polarizing material, and each of the small circular discs of material thus constituting the eyes 39 are mounted with their polarization axes at right angles to one another. The light then passes through the eyes 39 with a relatively inverse intensity that varies sinusoidally from a minimum to a maximum and back again during one half revolution of the plane of polarization of the light being projected through the disc 45. The intensity of the light which passes through each of the eyes 39 is relatively varied, as determined from the relative position of the follower disc 38, which contains the eyes 39 and the slot or transparent segment 37 of the opaque tape 36. The resulting combined passage of light through both eyes 39 is then directed toward the photo cell 35 and may be concentrated by another lens 48 if desired. The variations in intensity of the light received by the photo cell 35 creates a signal which may be amplified by the preamplifier 34 and then fed to the remainder of the control circuit for the servo motor 30. All of these elements of the system per se, i. e. photo cell 35, preamplifier 34, etc., are old and well known in the art and no further description thereof need be made.

It will be noted that there is a light shield 49 shown in

Fig. 2 which acts to exclude all light other than the polarized beam as transmitted through the disc 45. This shield is so shaped (Fig. 3) that the plane polarized light beam reaches the full arc of travel of each pair of eyes 39 while they are located straddling a given segment or trace 37.

Location of a given pair of eyes 39 relatively to the tape 36 is illustrated in Fig. 3 where a particular pair of eyes 39a is illustrated as straddling a segment 37 so that an equal area of each of the eyes 39a is exposed for transmitting light therethrough. Furthermore, it will be remembered that the light polarizing material of each of the eyes 39a is located at right angles with respect to the other.

The results of this arrangement are graphically indicated in Fig. 4. It may be observed that so long as the given pair of eyes 39a are accurately straddling the slot 37, so that equal areas of the eyes are exposed for passage of light therethrough, the output of the light variations as received by the photo cell 35 is a straight line 52 as shown in the top graph of Fig. 4. This straight line, or unvarying output, of light intensity is the result of two components of variably transmitted light as determined by each of the pair of eyes 39a. This is illustrated in Fig. 4 at the top graph by the dotted line wave shapes 53 and 54.

It will be observed that the variation of light intensity as transmitted by each of the eyes 39a separately is sinusoidal in accordance with the rotation of the plane of polarization as transmitted via the light polarizing disc 45. However, each of these sinusoidal variations are opposite in phase because of the location of the plane of polarization of the material of the eyes 39a, which planes are at right angles to one another. Consequently, the resulting ligth output to the photo cell 35 is a constant intensity light beam so long as the amount of light transmitted by each eye of the pair 39a is equal, and a steady state or invarying signal is created by the photocell 35.

If, however, the disc 38 carrying the eyese 39 travels faster or slower than the movement required to maintain the given pair of eyes 39a straddling the segment 37, a signal having a sine wave shape will be generated by the photo cell 35. The phase of this error or control signal will be determined by whether the disc and eyes are ahead of or lagging behind the desired location of the segment 37. It will be remembered that the tape 36 is being driven longitudinally beneath the disc 38 at a given constant rate of speed. The slope of the segments 37 is the determining factor in the speed of rotation necessary by the disc 38, to maintain the eyes 39 in their correct position relatively to the slot 37.

The lower two graphs illustrated in Fig. 4 show the form of the A. C. signal which is generated in the photo cell 35 when the particular pair of eyes 39a (Fig. 3) lead or lag the segment 37 over which they are located. For example, a curve 56 represents the output signal of photo cell 35 when the light shield, as created by tape 36 and segment or trace 37, is to the left when viewed as shown in Fig. 2. On the other hand, a similar A. C. signal as illustrated by a curve 57 is created when the light shield (tape and trace segment) is located to the right when viewed as shown in Fig. 2. It will be observed that in each case a signal having a given phase is produced, the phase being reversed upon a reversal of the situation with regard to eyes 39 and the trace segment 37. Such phase reversal takes place because of the reversal in the relative amplitudes of the two component waves or variations 53 and 54, which go to produce the output variation signals 56 and 57.

It will be noted that the motor 30 is an A. C. induction motor that reverses upon the reversal of phase of the control signal applied thereto. As indicated above, such a motor, and the control system therefor, is conventional and consequently is illustrated in block form.

It is pointed out that by employing a segmentized trace to control the servomotor, a high degree of performance may be had on account of the reduction in the size of the control motion from the trace or pattern to the output positioning of the load on the servomotor. Because of the saving in space, a reduction of size in the order of 100:1 may be had. Therefore, the pattern or trace may be one hundred times the size of the workpiece in a machine tool, for example.

In following the segments of the trace, the pair of "eyes" with light polarizing material at right angles therein, avoids many difficulties which might be found if two separate photocells were to be illuminated to form an error signal by combining them. This is because with two photocells, they would have to be matched exactly. Consequently, these and similar difficulties might arise, which are all eliminated by using the arrangement set forth herein.

As pointed out above the segments 37 of the trace being followed are made up of one or more slopes which may be chosen to vary from a maximum to zero. In this way the space-time curve to be followed by the servo system may be pre-calculated to a desired degree of accuracy by choosing one of a given number of slopes, e. g. twelve including zero, and matching them with the desired curve often enough to keep the displacement within tolerable limits. It will be clear that the compressing effect of the system in reducing a position change in scale from one hundred to one will effectively increase the accuracy manifold times. Moreover, the segments will usually be short enough that only one slope will be present for the whole segment, especially near the maximum slope.

Transition of the system from each segmentized portion of the control tape to the next may be substantially smooth by adjusting the relative sizes involved in connection with the disc 38 and the tape 36. However, some unevenness may be tolerated and will be found to create a signal having a tendency to drive the disc 38 too fast, so that this uneven transition period does not tend to cause a failure of the system to follow the movement of the segments 37 as created by the drive of the tape 36.

It will be appreciated that while a trace in the form of a strip on a photographic film has been shown and described, a segmentized medium for use in the control of a servo system in accordance with this invention might take various forms. For example, the trace might be in the form of a magnetic line located on a ribbon of magnetic material tape, and employing magnetic sensitive heads for following the segments of the line. Or, the trace might be in the form of a metallic line on non-metallic ribbon, and the sensing be done by spark or similar means. Or even a mechanical groove might be employed, having mechanical followers such as fingers or other convenient structure.

While a specific embodiment of the invention has been shown and described in detail, in accordance with the applicable statutes, this is not to be taken as in any way limiting the invention, but merely as being descriptive thereof.

It is claimed:

1. In a position servo system having a reversible alternating current motor that reverses direction of rotation with a reversal of phase of the control signal therefor and control means for reversibly energizing said motor, the combination comprising an opaque strip having a transparent segmented trace thereon, said segments having variable slopes proportional to the speed to be impressed on said motor, the segments of said trace representing telescoped portions of position change for said load, constant speed drive means for moving said strip longitudinally, control signal generating means including a disc driven by said motor, a source of plane polarized light the plane of which is being rotated at a given relative speed, a plurality of pairs of eyes in said disc each of which eyes has light polarizing material therein, the plane of polarization of the material for each eye being at right angles to that of the other eye of each pair of eyes, said eyes being juxtaposed adjacent to the trace segments on said strip, said trace segments acting with said strip to shield the area for light passage through said eyes in an inverse manner, and a light sensitive element located to receive light through both said eyes simultaneously as determined by said trace segments for generating an alternating current signal having a constant frequency which has one phase or the opposite phase depending upon the relative location of said trace segment and said eyes at any given instant.

2. An A. C. error signal generating unit comprising a source of plane polarized light, means for rotating the plane of polarization of said polarized light, photo cell means for receiving said light and generating a signal that varies proportionally to the intensity of the light received, a pair of apertures of equal area for passing said light to said photo cell means, inversely variable shield means for increasing the light passage through one aperture while decreasing the light passage through the other aperture a corresponding amount, and light plane polarizing material located in each of said apertures, the plane of polarization of the material in the pair of apertures being located at right angles to one another.

3. An A. C. error signal generating unit for generating an error signal variable in amplitude and reversible in phase comprising a source of plane polarized light, means for rotating the plane of polarization of said polarized light, photo cell means for receiving said light and generating a signal that varies proportionally to the intensity of the light received, a pair of round holes in a piece of opaque material, said holes being located in the path of said polarized light between said photo cell means and said light source, a light shield having an opening partially straddling both said holes and movable relative to said holes, and light plane polarizing material located in both said holes, the plane of polarization of the light for each hole being located at right angles to the plane of polarization for the other.

4. In a position servo system having a motor for reversibly positioning an output and control means for reversibly energizing said motor, said control means comprising an opaque strip having a transparent segmented trace thereon, said segments having variable slopes proportional to the speed to be impressed on said motor, the segments of said trace representing telescoped portions of position change for said output, constant speed drive means for moving said strip longitudinally past a signal generating station, and error signal generating means located at said station and including a disc driven by said motor, said disc having a plurality of pairs of eyes therein for transmitting light therethrough in a complementary way as determined by the relative location of a segment of said trace and a pair of said eyes, light sensitive means responsive to said transmitted light for producing control signals, and circuit means for energizing said motor under control of said signals so that the motor is energized in a direction and at a speed as determined by the slope of the segments of the trace in succession.

References Cited in the file of this patent
UNITED STATES PATENTS

| | | |
|---|---|---|
| 2,262,354 | Cates | Nov. 11, 1941 |
| 2,489,305 | McLennan | Nov. 29, 1949 |
| 2,503,052 | Keinath | Apr. 4, 1950 |
| 2,628,539 | de Neergaard | Feb. 17, 1953 |